United States Patent
Szewerenko et al.

(10) Patent No.: US 6,883,167 B1
(45) Date of Patent: Apr. 19, 2005

(54) METHOD AND SYSTEM FOR VISUAL LINKER

(75) Inventors: Leland Szewerenko, Pittsburgh, PA (US); David A. Syiek, Pittsburgh, PA (US); Edward Anderson, Gibsonia, PA (US)

(73) Assignee: Texas Instruments Incorporated, Dallas, TX (US)

( * ) Notice: Subject to any disclaimer, the term of this patent is extended or adjusted under 35 U.S.C. 154(b) by 442 days.

(21) Appl. No.: 09/604,112

(22) Filed: Jun. 26, 2000

Related U.S. Application Data (60) Provisional application No. 60/158,249, filed on Oct. 8, 1999, and provisional application No. 60/147,242, filed on Aug. 4, 1999.

(51) Int. Cl.[7] ............................................. G06F 9/44
(52) U.S. Cl. .................... 717/162; 717/163; 717/164; 717/165; 717/166; 717/167
(58) Field of Search ................................ 717/162–167, 717/145, 104–105

(56) References Cited

U.S. PATENT DOCUMENTS

| | | | | |
|---|---|---|---|---|
| 5,325,533 A | * | 6/1994 | McInerney et al. | 717/107 |
| 5,386,568 A | * | 1/1995 | Wold et al. | 717/162 |
| 5,519,862 A | * | 5/1996 | Schaeffer et al. | 717/165 |
| 5,519,866 A | * | 5/1996 | Lawrence et al. | 717/162 |
| 5,950,221 A | * | 9/1999 | Draves et al. | 711/100 |
| 5,956,513 A | * | 9/1999 | McLain, Jr. | 717/142 |
| 5,999,730 A | * | 12/1999 | Lewis | 717/109 |
| 6,021,272 A | * | 2/2000 | Cahill et al. | 717/147 |
| 6,064,812 A | * | 5/2000 | Parthasarathy et al. | 717/105 |
| 6,247,175 B1 | * | 6/2001 | Ledford et al. | 717/157 |
| 6,317,870 B1 | * | 11/2001 | Mattson, Jr. | 717/151 |
| 6,487,713 B1 | * | 11/2002 | Cohen et al. | 717/105 |
| 6,493,868 B1 | * | 12/2002 | DaSilva et al. | 717/105 |

* cited by examiner

*Primary Examiner*—Todd Ingberg
*Assistant Examiner*—Qamrun Nahar
(74) *Attorney, Agent, or Firm*—W. James Brady, III; Frederick J. Telecky, Jr.

(57) ABSTRACT

The present invention provides a visual linker. The visual linker includes a link server that implements linking instructions for sections to a memory. The visual linker also includes a graphical user interface that receives said instructions and displays said sections within said memory. The visual linker also includes an application programming interface that receives said instructions and reports the results of said linking instruction and said sections within said memory. The visual linker also includes an incomplete link comprising sections not allocated to said memory. The visual linker also includes a link recipe comprising said instructions implemented by said link server.

18 Claims, 12 Drawing Sheets

FIG. 8B  FROM FIG. 8A

FIG. 9A    TO FIG. 9B

FIG. 9B  FROM FIG. 9A

METHOD AND SYSTEM FOR VISUAL LINKER

This application claims the benefit of Provisional Application Ser. No. 60/147,242, filed Aug. 4, 1999, and U.S. Provisional Application Ser. No. 60/158,249, filed Oct. 8, 1999.

TECHNICAL FIELD OF THE INVENTION

The present invention relates to software development tools, and, more particularly, to software program linking and methods.

BACKGROUND OF THE INVENTION

Software is constructed in pieces. Source code is expressed in a language, such as "C" or assembly, and is organized into multiple text files. Each of these files is processed into a corresponding binary file known as an object file by a compiler and/or an assembler. A linker combines the object files into a single file. The linked output file may be a complete application, and may be executed on a particular target computer hardware system. Alternatively, the output may be a partial link such that it is used as an ingredient in a subsequent link.

To perform the linking process, the linker is given a list of ingredient object files, a description of the target computer memories and directions on how to combine and place the ingredients into the memories. The ingredient files are composed of "sections". Each section contains code or data to be placed into the memories. During this process, different sections of the compiled application are assigned to various memories of the target hardware system. Embedded systems, such as digital signal processors ("DSPs"), have a plurality of memory types with different sizes, speeds and other characteristics. The allocation of application code and data to the different locations in memory affects the performance of the application after it is embedded onto the hardware system.

Figure 1:
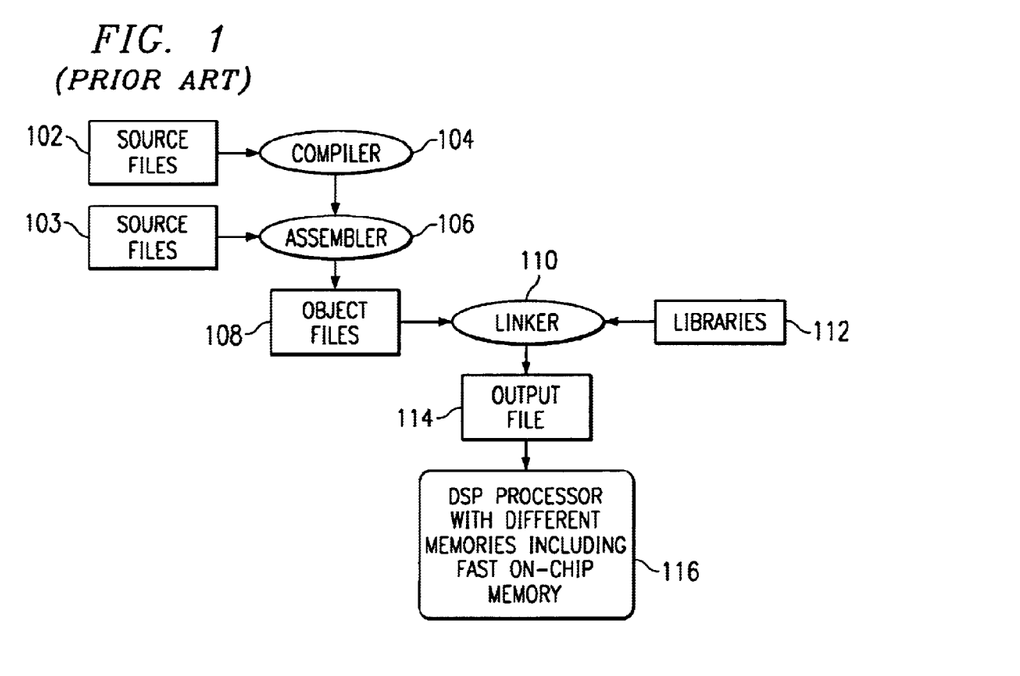
FIG. 1 illustrates a known software development system.

Referring to FIG. 1, a software development system 100 is depicted. As described above, text files 102 and 103 are source code written by a programmer. Text files 102 and 103 may represent a plurality of text files. Compiler 104 translates the source code in text files 102 into assembly language source code. Text files 103 represent assembly language source code files written manually. Assembler 106 translates the assembly language source files from compiler 104 or a programmer. Machine language object files 108 are outputted from assembler 106. Object files 108 may be known as object programs or object modules. As described above, object files 108 are the corresponding binary files to text files 102 and 103, either alone or in combination.

Linker 110 combines object files 108 into a single executable object module, or output file 114. In addition to object files 108, linker 110 accepts library files 112 containing multiple object files. Linker 110 also allows for the combination of object file sections, binds sections or symbols to addresses within memory ranges, and defines or redefines global symbols. After linking operations are completed, output file 114 is downloaded to processor 116. Thus, linker 110 places object files 108 in memory on processor 116 as output file, or output program, 114.

Figure 2A:
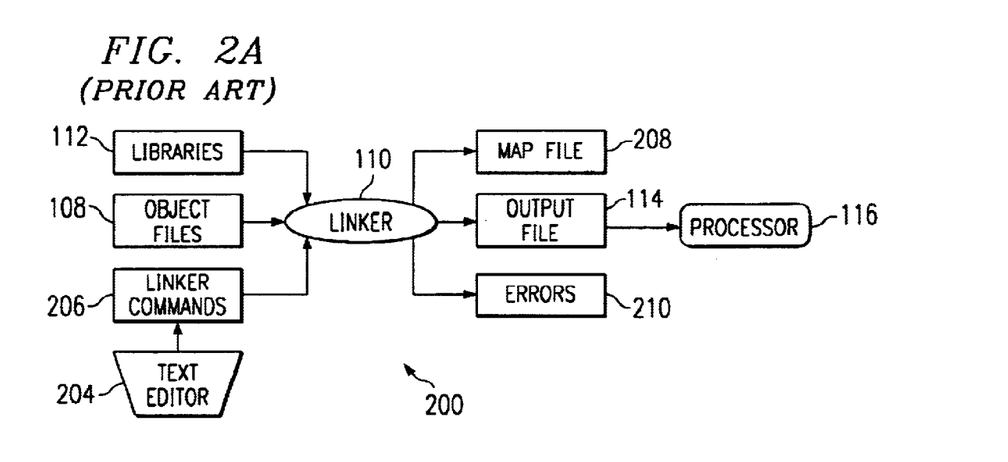
FIG. 2A illustrates a known linker.

FIG. 2A depicts a known linker within a software development system 200. Linker 110 is given a list of object files 108, a description of the computer hardware memory, and directions on how to combine and place object files 108 in linker commands 206.

Linker allocation directions in linker commands 206 are expressed in a custom text-based command language requiring extensive study and documentation. A user inputs and edits linking instructions in text editor 204. Text editor 204 writes instructions into command file 206 to be inputted into linker 110. The user studies the textual linker output in map file 208 and errors 210 for the results of the linking instructions and makes any necessary changes to the command file 206. This process is repeated until the desired results are obtained. Linker 110 receives object files 108 and library files 112. Using command file 206, linker 110 links ingredients 208 according the linking instructions to separate output file 114. As described above, output file 114 may be an executable application.

Figure 2B:
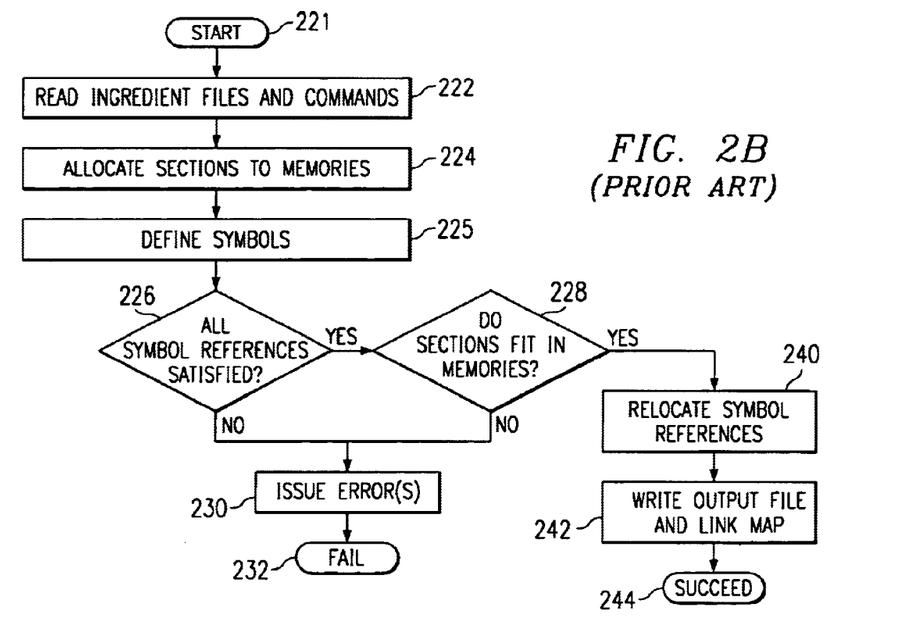
FIG. 2B illustrates a flowchart depicting a known linking method.

FIG. 2B depicts a flowchart of a known method for performing linking operations using a known linker. Step 221 executes by starting the linking operations in linker 110. Step 222 executes by linker 110 reading ingredient files and commands, such as object files 108, libraries 112 and linker commands 206. Step 224 executes by linker 110 allocating the sections, or blocks, of code and data to memories within the target hardware computer system. Linker 110 uses the instructions written in linker commands 206 to allocate the sections. Step 225 executes by defining the value of symbols according to the allocation of the sections of the ingredient files. Some symbols represent call or branch destinations within a section of code. Other symbols represent individual variable locations within a section of data. As the sections are located at a specified address in a memory, the symbols within the placed sections inherit specific addresses and are said to be "defined".

Step 226 executes by determining whether all reference symbols have been defined by linker 110. If no, then step 230 executes by issuing an error signal or message. If yes, then step 228 executes by determining whether the sections of code and data fit in the target memories. If no, then step 230 executes by issuing an error signal or message as a problem has arisen that must be resolved. If yes, then step 240 executes by relocating symbolic references in the allocated sections of code or data. Step 242 executes by writing output file 114 and link map file 208 for review by a user.

Step 232 executes by denoting a failure has occurred in the linking operations. Step 232 may execute subsequent to the error message in step 230. Step 244 executes by denoting the linking operations have been successful.

Figure 3:
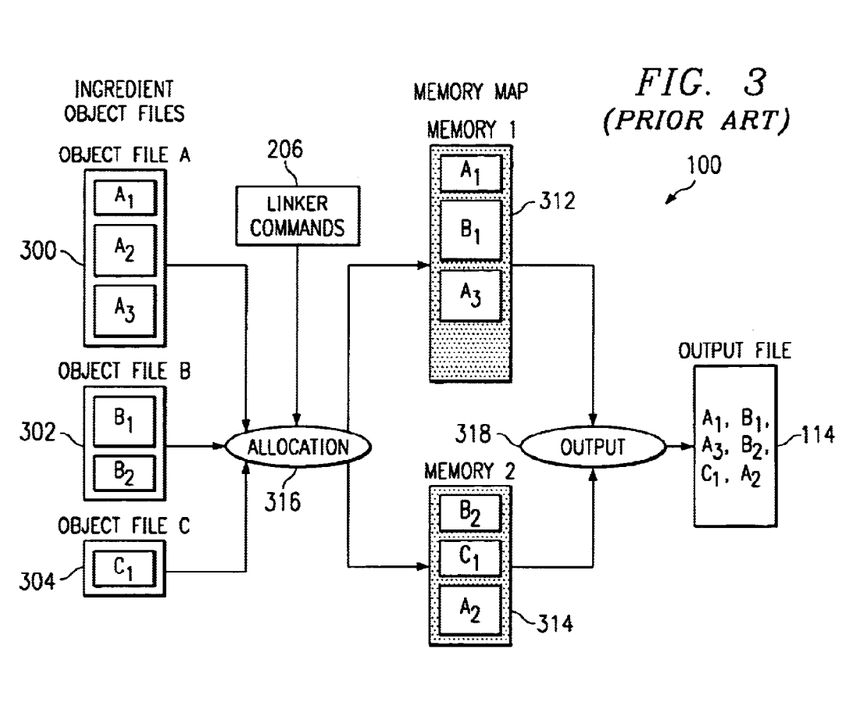
FIG. 3 illustrates a known linker having allocation and output modules.

FIG. 3 depicts a known linker allocating object files to a memory. Linker 110 includes allocation module 316 and output module 318. Ingredient 300, or object file A, includes sections A1, A2, and A3. Ingredient 302, or object file B, includes sections B1 and B2. Ingredient 304, or object file C, includes section C1. The sections may represent blocks of code or data. Object files A, B, and C may be object files within an application.

Allocation module 316 inputs linker commands 206. Linker commands 206 are a set of instructions that tell allocation module 316 where to place the sections of object files A, B, and C in the target computer hardware memories. Memories 312 and 314 represent memory devices within the target system. Memories 312 and 314 have different locations and addresses within the address space of the target system. Using the linking instructions, allocation module 316 places each section within the ingredients into a memory device. For example, allocation module 316 places section A1 of object file A in memory 312 at a specified location. Allocation module 316 also places section B1 of object file B in memory 312 at another location, different from the location of section A1.

Allocation module 316 also resolves any issues regarding symbolic references within the sections of the object files. Sections may have calls, or branches, to subroutines in other sections within the object files, or even to other object files.

These calls are represented by symbol references within the code. As the sections of code are linked within memories 312 and 314, the symbolic references to symbols within these sections are replaced by address locations within the memory.

Figure 4:
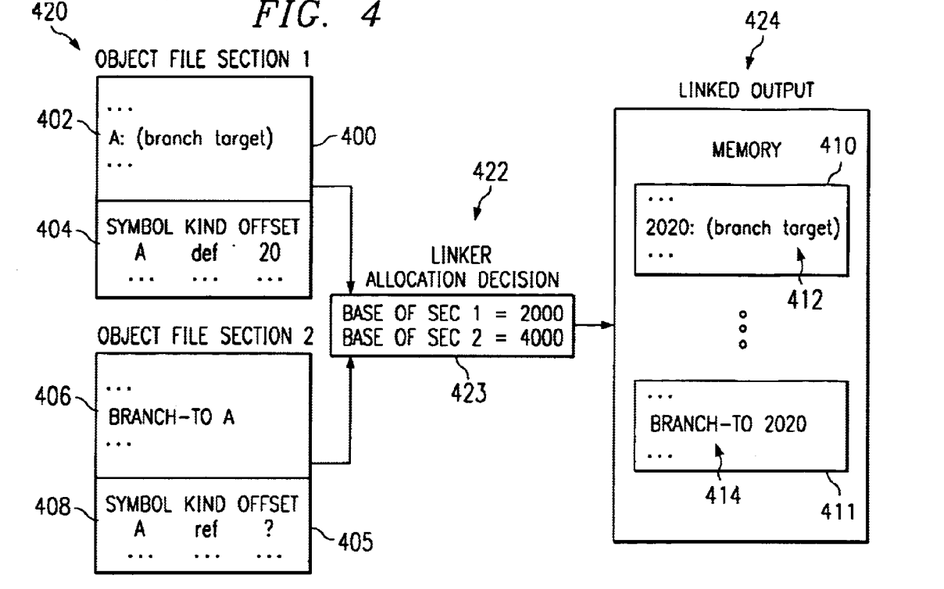
FIG. 4 illustrates a known linker symbol resolution system.

Referring to FIG. 4, a linker symbol resolution system is depicted. Ingredients 420 include object files having a plurality of sections of code, including sections 400 and 405. Section 400 includes a code block 402 that contains a definition of a branch label A. Code block 402 also includes other information. Section 400 also includes a symbol dictionary block 404 that lists symbol A as being defined in section 400, and has an offset of 20 from the origin of code block 402.

Section 405 includes a code block 406 and a symbol dictionary block 408, similar to section 400. In code block 406, a branch instruction lists branch label A as its target. Symbol dictionary block 408 lists symbol A as being a reference to a definition elsewhere without a known offset as section 400 has not been allocated to a memory location.

During the allocation phase of allocation module 316 in FIG. 3, linker allocation decision module 422 allocates sections 400 and 405 of ingredients 420 to specific addresses in the target computer hardware memory. Linked output file 424 includes allocated sections 410 and 411 that correspond to section 400 and 405, respectively. Branch target 412, or label A, is located within allocated section 410. Further, branch instruction, or call, 414 to label A is located within allocated section 411. Branch instruction 414 is known as a symbol reference within allocated section 411.

The base, or beginning, addresses of sections 400 and 405 are recorded in table block 423 inside linker 110. For example, the base address of section 410 is memory address 2000. Referring to symbol dictionary block 404, symbol A has an offset of 20 from the base address. Thus, branch target 412, or label A, is located at address 2020 within the memory.

During the relocation and output steps of the linking operations, all symbol references 414 are replaced by actual addresses computed by adding the symbol offsets in the symbol dictionaries to the section base addresses in table block 423. These addresses are inserted into the linked code, such as symbol reference 414. Thus, the symbol references are replaced by address locations by linker 110.

Referring back to FIG. 3, after allocation module 316 completes the allocation of the sections of object files A, B, and C, then output module 318 links the sections within the memories to generate output file 114 that represents an application to be run on a target computer system.

The linking process involves a preparation period for a user to resolve any errors with the linking process, as described in step 230 of FIG. 2B. Known linkers report errors and may fail to complete the allocation of the ingredients object files if there are unresolved symbolic references. Thus, if the list of input object files and libraries is not complete, then an error occurs within the linking process. The user then re-edits command file 206 to improve or adjust the linking instructions. This activity inhibits interactive allocation strategies in which a user attempts to optimize the allocation of only a part of the ingredients of the software program before the remaining parts of the program are available or written. No links may be left incomplete. Therefore, extensive experimentation is prohibited and users are discouraged from finding more optimal ways of linking.

Attempts to reduce development time for the linking instructions include tools that dialogue with the user, and write linker instruction command files for the user. These tools are appropriate for simple applications, but may not be able to adequately optimize complex applications or memories. Another attempt includes a visual link map analyzer that uses visual input to edit a linker instruction command file, and runs the command file through the linker. The analyzer displays the linker map file 208. These systems, however, include two separate programs, a traditional linker and a visual analyzer. These programs maintain separate models of the link in order to perform their respective tasks.

Further, known linkers are unable to resolve incomplete links. Referring back to FIG. 2B, all sections must fit in memories before an output file may be created or the symbol references resolved. This requirement inhibits interactive linking strategies as all links must be complete before an map file is generated for review by the user.

As software applications evolve, the ingredients change as do the sizes and the properties of the individual ingredient object files 108. The instructions in command file 206 for allocation of a target system memory may become obsolete periodically and require maintenance. Directions are updated to interface with new hardware target system memories.

In many instances, it is the user's responsibility to understand all component specifications and requirements and to reflect them in text-based linker command file 206. The user combines these constraints in generating the linking instructions with text editor 204. For updates, the user manually merges linker command file 206 into a bigger command file each time.

Linking operations impact performance on embedded processors, such as digital signal processors. Unlike general purpose processors having a single, large memory, embedded processors have many different memories. The layout of the application into various target memories impacts performance. Certain kinds of fast memory, such as on-chip memory, are limited in space and desired for critical application functions. Trade-offs are made depending on the size of the programmer's application plus any third party components and libraries. As the program evolves and grows, the allocation decisions are revised in a time-consuming manner.

New software development tools that build applications from large, predefined components are available. The tools attempt to manage the linking process, but are hindered by having to write commands 206 and by having to parse map files 208, and error files 210, that intended for humans.

SUMMARY OF THE INVENTION

From the foregoing it may be appreciated that a need has arisen for a system and method for an interactive, visual linker that may be controlled either by humans or software components. In accordance with one embodiment of the present invention, a method and system for a visual linker is provided that substantially eliminates and reduces the disadvantages and problems associated with conventional linkers in software development systems.

The present invention allows a user, software program, or component via commands, gestures, and application programming interfaces ("API") to specify a link in an incomplete fashion. During such incremental specification, the link may be incomplete. Ingredient object files need not be complete. Nor do all sections from each object file need be placed (allocated) into memory. Symbolic references need not be resolved.

With reference to the incomplete link, the visual linker of the present invention communicates to the user via visual or graphical displays without producing errors or other procedures to prevent further linking operations. This feedback includes the allocated position and size of the sections that are allocated to memory, the values of symbols that are allocated, a list of symbolic references that are not defined, and a list of ingredient object files and sections that are not allocated. Thus, the user receives real-time feedback on the results of the linking operations even if not all object files and sections are allocated to a location in memory. Therefore, the user may experiment with different linking strategies without the need for actually completing the link.

The present invention includes a graphical user interface (GUI) that receives commands or gestures from a user via an input device and translates the commands or gestures into linking instructions or steps. The commands or gestures include drag-and-drop commands, and menu commands using a pointing device such as a mouse.

The present invention also includes a link server API that allows client software programs or program components to participate in the link process. The link server provides continuous feedback to the client programs or components and this enables the programs or components to monitor and react to the incomplete link described above.

Further, the user (via the GUI) or the client program may alter incrementally an incomplete, link by a plurality of commands, either alone or in combination. The commands include adding or removing ingredient object files or code sections to be included in the linking operations. The commands also include specifying the sections from the ingredient files that are to be allocated. The commands also include deallocating or reallocating sections previously allocated. The commands also include specifying a memory area that certain sections or various kinds of sections are to be allocated. The commands also include specifying constraints on the allocation of certain sections and object files, such as specifying absolute addresses for sections or symbols, or specifying alignment constraints on addresses for sections or symbols. The commands also include specifying the order that sections and object files are allocated. The commands also include defining new symbols that are referenced by object files during linking operations.

The link server provides continuous feedback from the linking operations. Feedback is information passed from the linking operations back to the client software program or component so that the program or component may perform additional operations. Via the link server, the client software program or component may determine the address assigned to a section or symbol during linking operations. The program or component may determine the length of a section. The program or component may determine whether any section is not allocated as specified. The program or component may determine whether any control action succeeded or failed. Further, the interface between the link server and other software programs or components allows more than one program or component to simultaneously control and/or receive feedback during linking operations.

Link instructions (steps) received by the link server are recorded and may be replayed, without user interaction, to obtain a similar effect as the sequence of commands or gestures. The linker also allows the steps of the recipe to be viewed and individually changed. The linker also allows the steps of the recipe to be imported into other recipes to perform part or all of a linking process.

During the process of creating the steps, the link server may generalize the gestures or commands. Thus, a consecutive series of commands or gestures that result in moving each section of a particular kind to a particular memory area is generalized to a single step that moves all sections of the particular kind to the particular memory area. Further, a command or gesture that moves each section currently referenced by a particular section is generalized to a single step that moves any sections referenced by the particular section. Moreover, a command or gesture that moves each section from a particular object file is generalized to a single step that moves all sections from the particular object file.

A technical advantage of the present invention is that a visual linker is provided. Another technical advantage of the present invention is that a visual linker is portable and compatible with multiple target embedded memory systems. Another technical advantage of the present invention is that the visual linker interacts with other software tools and wizards.

Another technical advantage of the present invention is that the visual linker allows a user to view visual and graphical memory layouts while adjusting memory allocations. Another technical advantage of the present invention is that the visual linker may be a stand-alone software tool. Another technical advantage of the present invention is that the time to develop linking process instructions and strategies is reduced. Another technical advantage of the present invention is that unused code and unused data are automatically eliminated from the link through the use of a reachability check done using a cross-reference graph, thus reducing the size of the linked application. Another technical advantage of the present invention is that training requirements are minimized and training time is reduced. Another technical advantage of the present invention is that maintenance time is reduced. Another technical advantage of the present invention is that a visual linker is provided with increased functionality. Another technical advantage of the present invention is that the visual linker allocates blocks of code to embedded memory machines without running confidence check programs and in reduced time.

BRIEF DESCRIPTION OF THE DRAWINGS

For a more complete understanding of the present invention, and the advantages thereof, reference is now made to the following descriptions taken in connection with the accompanying drawings, in which.

DETAILED DESCRIPTION OF THE INVENTION

Figure 5A:
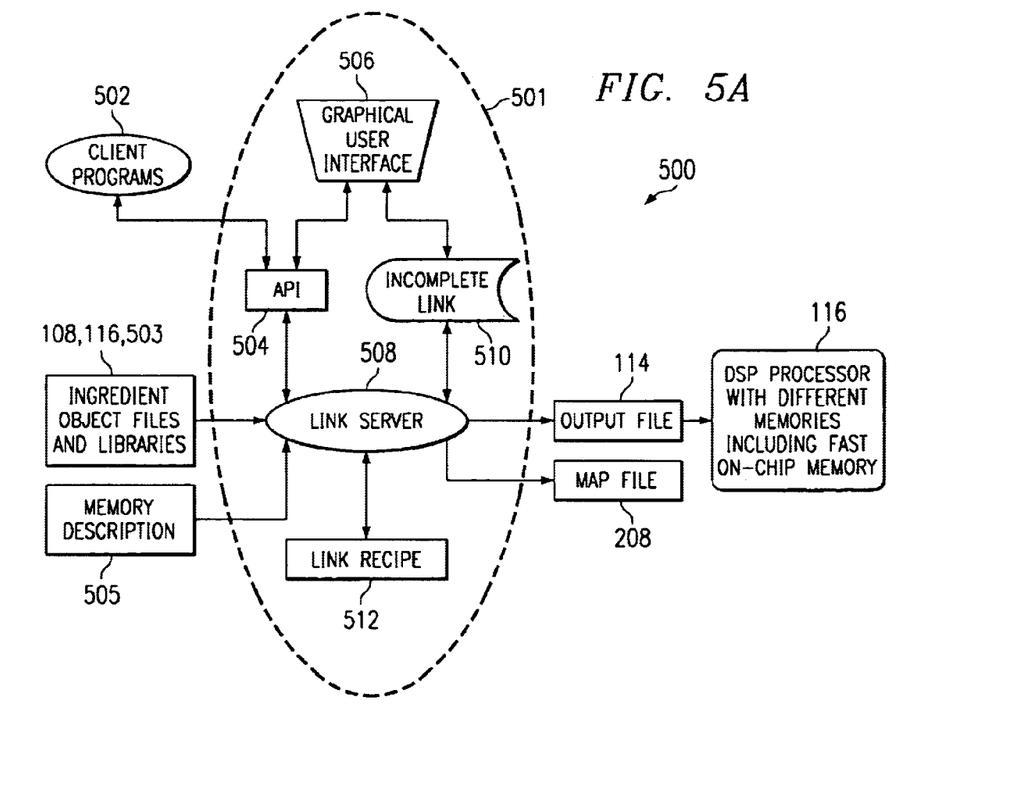
FIG. 5A illustrates a linker within a software development system in accordance with an embodiment of the present invention.
Figure 5B:
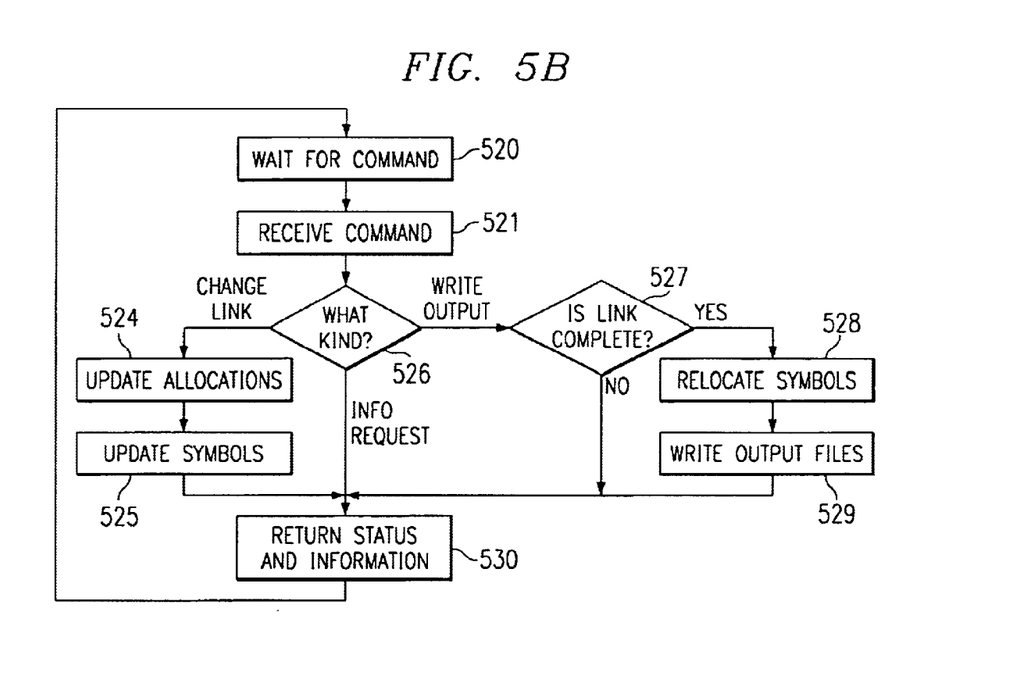
FIG. 5B illustrates a flowchart depicting a method for linking with a visual linker in accordance with another embodiment of the present invention.

An embodiment of the present invention and its advantages are best understood by referring now in more detail to FIGS. 5A and 5B of the drawings, in which like numerals refer to like parts. FIGS. 5A and 5B illustrate a visual linker in accordance with one embodiment of the present invention.

FIG. 5A depicts a software development system 500 in accordance with one embodiment of the present invention. Software development system 500 includes visual linker 501. Visual linker 501 is a visual, interactive, extensible linker. Visual linker includes link server 508, graphical user interface ("GUI"), and API 504. Visual linker 501 also includes incomplete link 510 and link recipe 512. Visual linker 501 inputs a list of input object files and libraries within ingredients 503. The link server 508 constructs a cross-reference graph for all input sections and uses this graph to make available for allocation only those code and data sections that are actually needed. Visual linker 501 also inputs a memory description 505 for processor 116. Processor 116 may be a digital signal processor, or another embedded processor.

Figure 6:
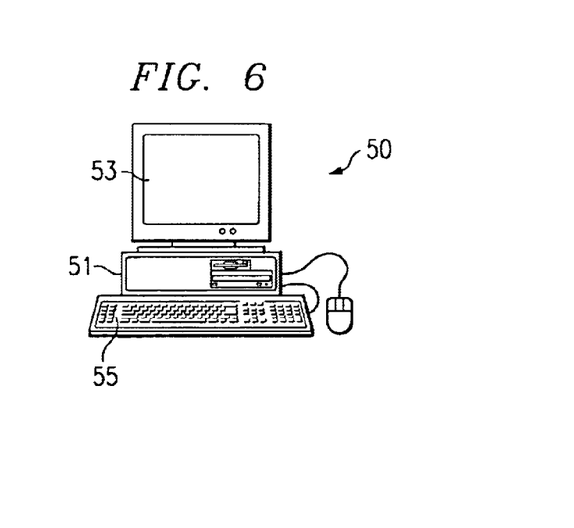
FIG. 6 illustrates a workstation.

In hardware terms the visual linker 501 may be as illustrated by FIG. 6 as a programmed computer workstation with a display, keyboard and mouse connected to the processor which performs the server operation and includes a linker program for linking and displaying results through the GUI interface. The GUI provides windows and drag-and-drop operations with the mouse and wizards for setup by step-by-step inquiries. A user developing a linking strategy executes a linking process using visual linker 501. The user interfaces with visual linker 501 via GUI 506. GUI 506 may utilize a display device, such as a computer monitor, to create a graphical representation of the memory layout within processor 116. GUI 506 also may accept input from a keyboard allowing the user to send commands to the visual linker 510. GUI 506 also may accept input from a mouse or other pointing device allowing a user to send commands using gestures such as drag-and-drop and point-and-click to visual linker 510. Using GUI 506, a user may allocate ingredients 503 to a layout of the memories for processor 116. By receiving linking instructions via GUI 506, visual linker 510 specifies how code and data sections from object files, library files, and other files within ingredients 503 are to be allocated to the memories of the processor. After each instruction, the user views the results of the linking instructions using the graphical representation placed on the display device by the GUI 506. These results include how much memory is allocated to the sections of ingredients 503, how much memory of processor 116 is unallocated, etc.

Figure 7A:
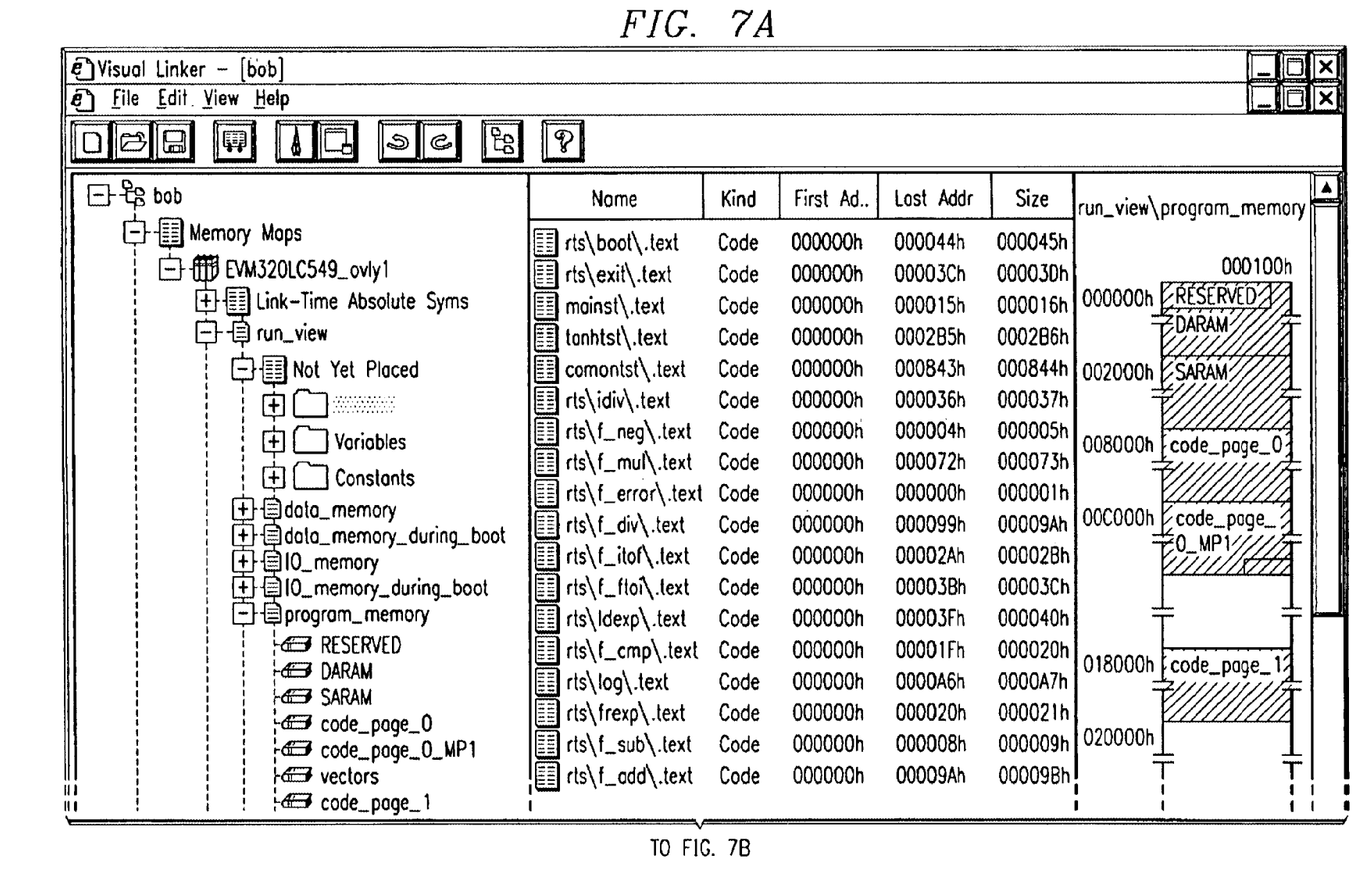
FIG. 7 illustrates a display screen presented by one embodiment of the invention, where a user may perform drag-and-drop and point-and-click operations that may be automatically translated to link operations.
Figure 7B:
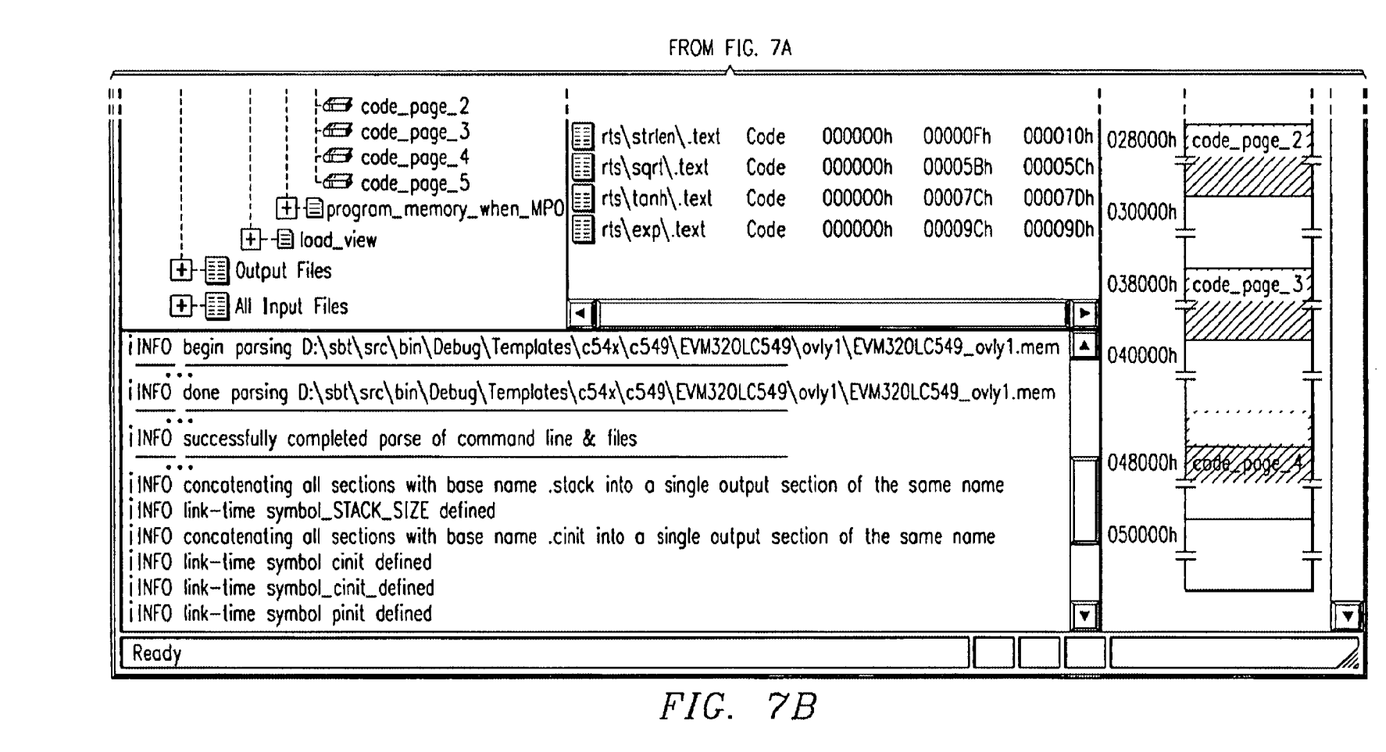

Referring to FIG. 7 there is illustrated a display screen of one embodiment of the present invention. A user may use a pointing device to drag-and-drop icons representing sections and thus specify allocation operations.

GUI 506 displays the results of the linking operations by showing where sections of code within ingredients 503 are allocated. GUI 506 and link server 508 share the same data structure describing the state of the incomplete link. GUI 506 may display this information in a variety of ways. Thus, visual linker 501 via GUI 506 may display the output grouping of sections, or output groups, a hierarchical visual tree, such that output groups may contain input sections or other output groups. Visual linker 501 provides a hierarchical, visual tree view of the target memories within processor 116. Further, visual linker 501 provides a hierarchical, visual tree view of incomplete link 510. In addition, visual linker 501 provides a layered memory picture via GUI 506 such that the layers correspond to a hierarchical tree view of output sections, including output sections of incomplete link 510.

Further, client software programs 502 specify linking instructions or commands. The instructions or commands are received by API 504 and passed onto link server 508. Link server 508 then executes the operation. Thus, visual linker 501 allows other software programs or program components to participate in the link process. Visual linker 501 also enables client programs 502 to accept or modify incomplete link 510, as described below.

Visual linker 501 includes incomplete link 510. Incomplete link 510 may represent a list of object files within ingredients 503 that are not complete in that some files are missing. Incomplete link 510 also may represent object files having sections that have been allocated and sections that have not been allocated. Further, incomplete link 510 represents the result of the symbolic references not being resolved. The symbolic references are not resolved because not all code sections have been allocated to a location in the target memories represented by memory description 505.

Visual linker 501 reports that status of incomplete link 510 back to the user via GUI 506 or to client programs 502 via API 504. Visual linker 501 may report the allocated position and size of allocated sections from the object files of incomplete link 510. Visual linker 501 also may report the values of symbols that have been allocated to a memory location in incomplete link 510. Further, visual linker 501 also may report the list of symbolic references that are not defined by incomplete link 510 as their location in the target memory has not been specified. Moreover, visual linker 501 may report the list of object files or sections of ingredients 503 that have not been allocated by link server 508.

After the user or client programs 502 receives the status of incomplete link 510, further instructions or commands to incrementally complete incomplete link 510. The user uses gestures via GUI 506 and client programs 502 use commands via API 504 to allocate, deallocate or reallocate additional sections of the object files and libraries within ingredients 503. The changes to incomplete link 510 resulting from these actions are reported back through GUI 506 or API 504. Symbols within incomplete link 510 may be defined or redefined as a result of the actions received by visual linker 501. In addition, commands or gestures received may add or drop ingredient object files or sections from incomplete link 510. Thus, incomplete link 510 is modified in an event driven manner by commands or gestures received through API 504 and GUI 506. The commands or gestures manipulate link server 508, which, in turn, modifies incomplete link 510.

Client programs 502 or a user control visual linker 501 with a variety of actions. Specifically, visual linker 501 is event-driven in that external events are received by GUI 506 and API 504. GUI 506 and API 504 translate the received events into linking instructions. The events include gestures through GUI 506, such drag-and-drop, and commands issued by client programs 502 through API 504.

The linking instructions control visual linker 501 and the resulting linking process. Thus, client programs 502 may control visual linker 501 by adding or removing object files within ingredients 503 and by specifying which of the sections from ingredients 503 are to be included in the link being performed by link server 512. Further, client programs 502 may control visual linker 501 by allocating, deallocating or reallocating sections of ingredients 503 previously allocated.

Visual linker 501 also receives input via GUI 506 and API 504 that specifies the memory area within processor 116, and as described in memory description 505, into which particular sections are to be allocated by link server 508. Various kinds of sections or object files, such as libraries, also may be allocated by specifying a memory area.

Client programs 502 controls visual linker 501 via API 504 to specify constraints on the allocation of particular sections. These instructions may specify absolute addresses for certain sections or symbols, or specify alignment constraints on addresses for sections or symbols. Further, these instructions may specify a specific order to allocate sections and symbols within ingredients 503.

Client programs 502 control the link server 508 via API 504 to define new symbols that may be referenced by sections in the link. Client programs 502 also control link server 508 through API 504 to specify characteristics of the allocation strategy.

Link server 508 provides feedback to client programs 502 through API 504 on the status of linking operations or the results of events received. After receiving the information, client programs 502 may take further action or define further events. Client programs 502 may use the information from link server 508 to determine an address assigned to a section or symbol by link server 508 or to determine the length of an allocated section. Client programs 502 also may use the information from visual linker 501 for troubleshooting or optimizing the linking process. For example, client programs 502 may determine whether any section is not allocated as specified by the received linking instructions or determine whether any control action mentioned above succeeded or failed.

A user may control visual linker 501 like client programs 502 via GUI 506. Thus, visual linker 501 is controlled according to the operations described above by more than one entity. In addition, the user may use feedback from visual linker 501 via GUI 506 to determine the status of the links and other parameters, as described above. With the interfaces of API 504 and GUI 506, a multiple entities may control and receive feedback from visual linker 501.

As visual linker 510 receives linking instructions from the user or client programs 502 via API 504, a linking recipe 512 is generated. Linking recipe 512 may be the set of linking instructions or strategies received by API 504 that describe how visual linker 501 is to be controlled. Link server 508 executes the instructions and generates the step to be included in linking recipe 512.

Figure 10A:
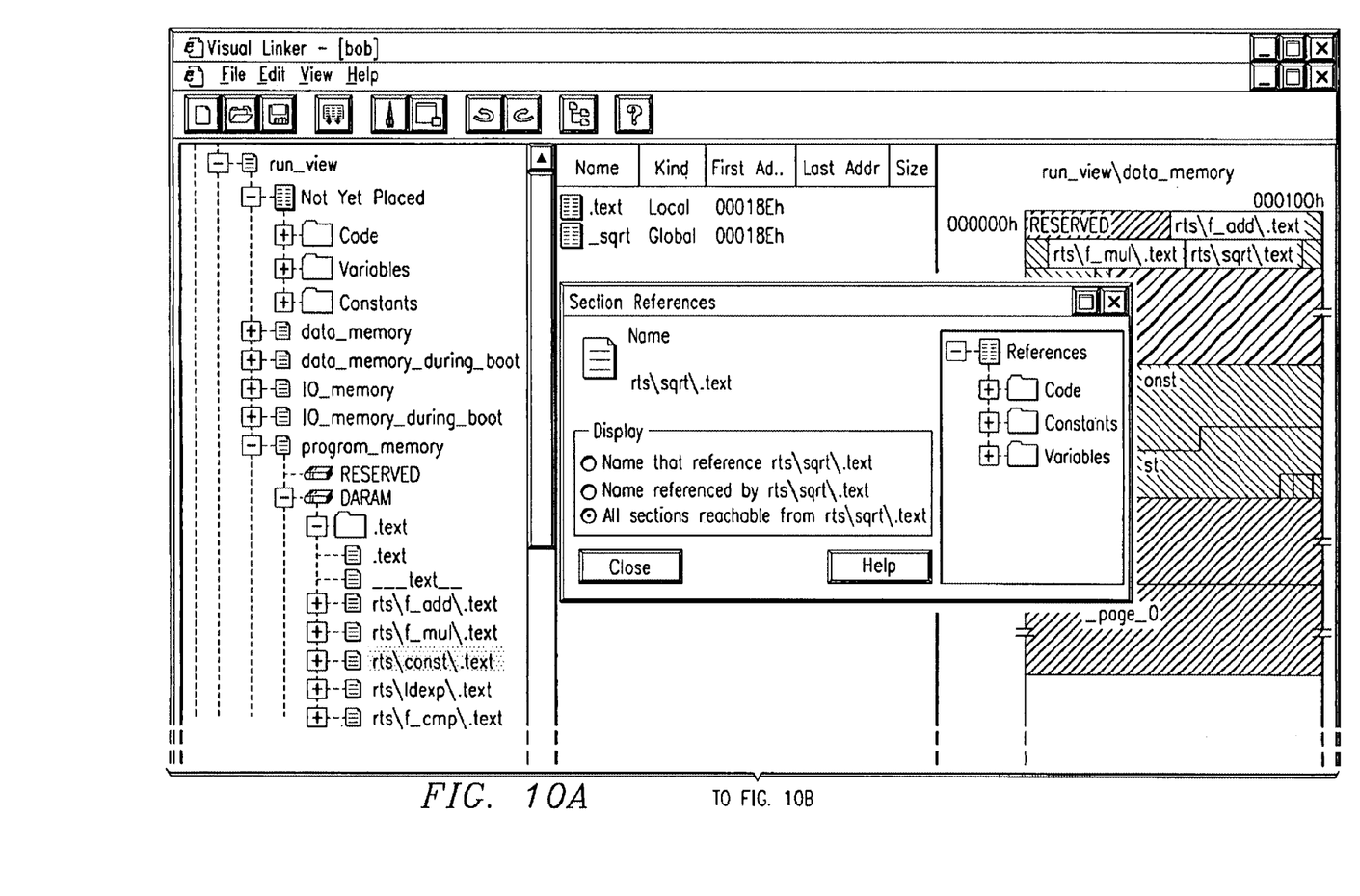
FIG. 10 illustrates a display screen presented by one embodiment of the invention where a user may view and allocate code sections reachable from the square root function. This figure also illustrates a display for the recorded link strategy showing the instruction recorded for a drag-and-drop from the cross-reference graph display.
Figure 10B:
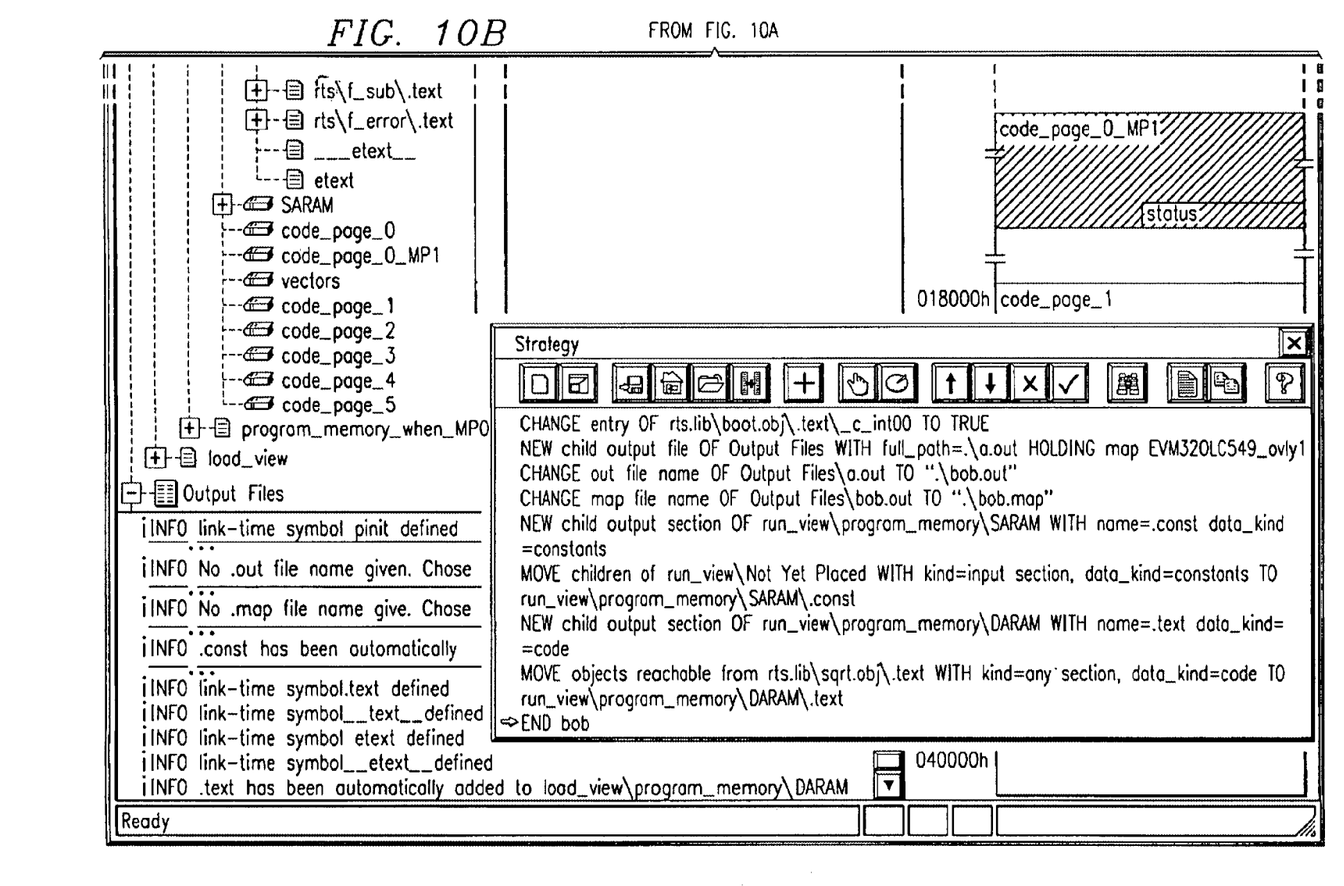

The link server 508 can replay the steps of the linking recipe 512 without user interaction, to obtain the same effect as the sequence of gestures. The link server 508 may access the steps of the linking recipe 512 and in conjunction with the GUI allow the steps to be viewed and changed on an individual basis (FIG. 10). Linking recipe 512 may be stored as a file or imported into other recipes to perform all or part of a link.

When creating linking recipe 512, visual linker 501 may generalize the events received from the user or client programs 502. These events may include gestures or commands, and are translated by API 504 and GUI 506. A consecutive series of events that moves each section of a particular type is generalized to a step in linking recipe 512 that moves all sections of that type to the specified memory area. Further, an event that moves each section currently referenced by a particular section is generalized to a step that moves any section referenced by the particular section to that location. An event that moves each section of a particular object file is generalized to a step that moves all sections from the particular object file. Thus, the steps of linking recipe 512 allow for a strategy that includes control of visual linker 501 to allocate sections that might exist in a future link and meet a specified criteria to be allocated according to linking recipe 512 without the need for revisions or updates.

Figure 8A:
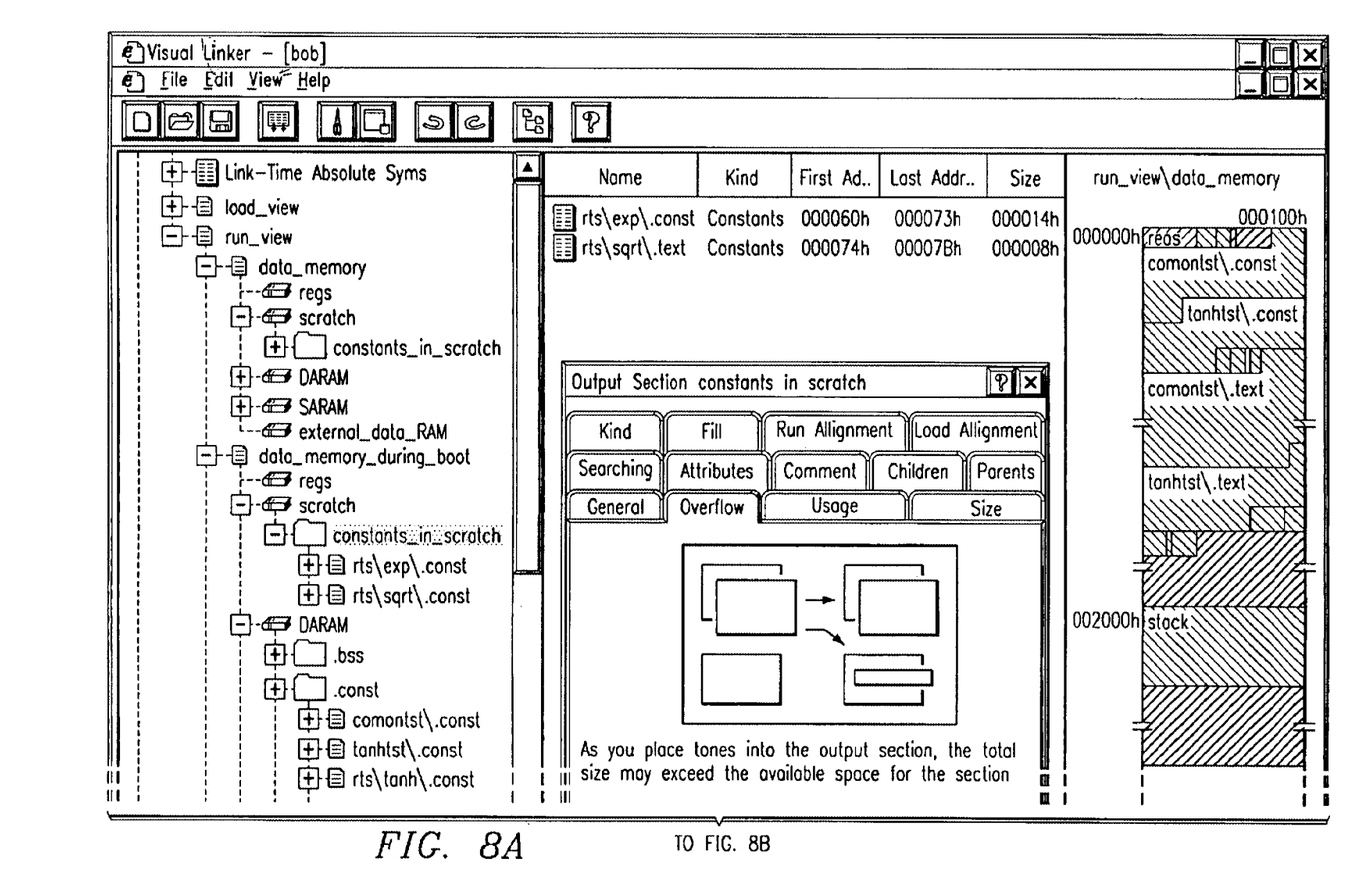
FIG. 8 illustrates a display screen presented by one embodiment of the invention where a user may specify a policy to handle overflow when an area of memory fills up during allocation.
Figure 8B:
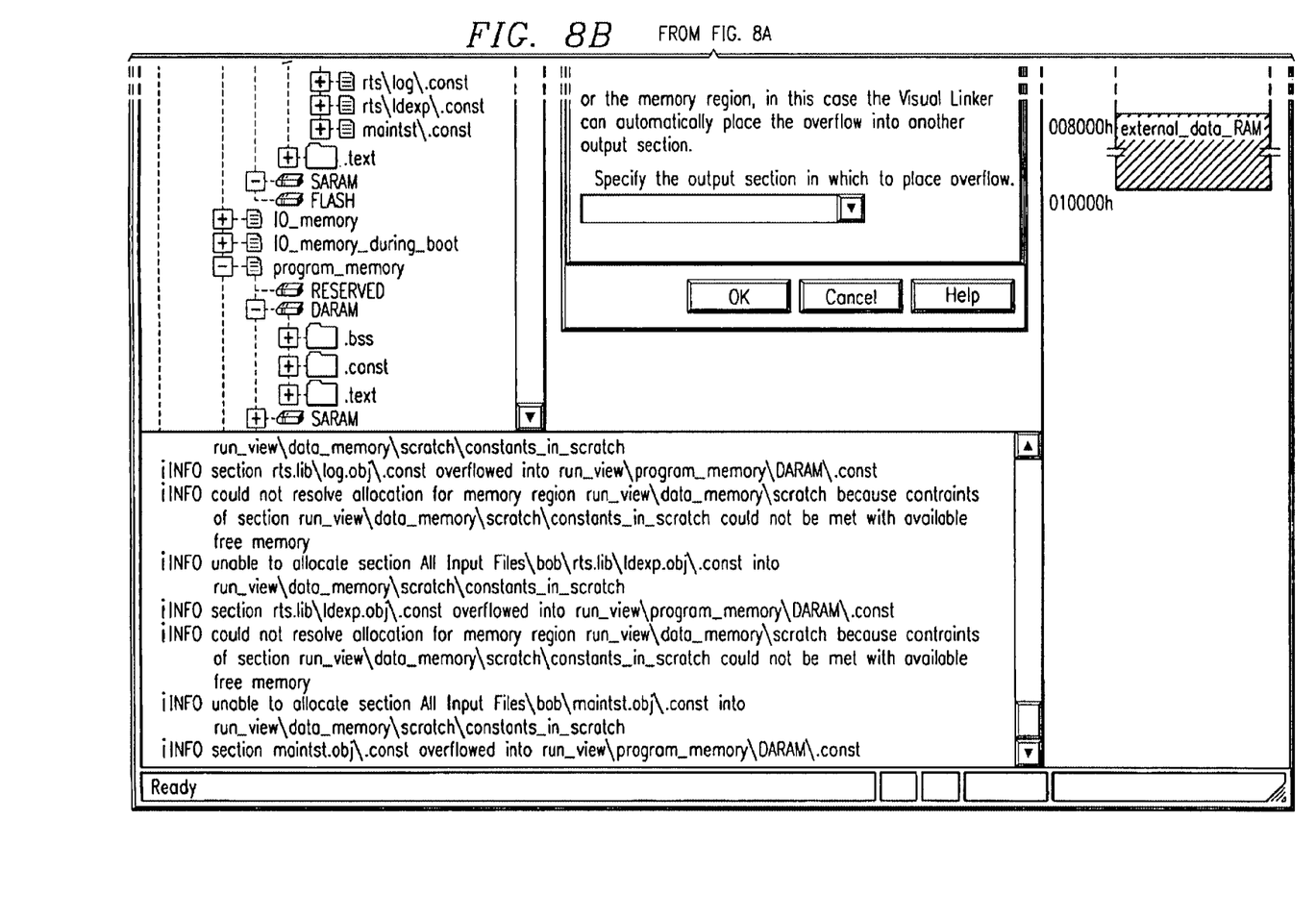
Figure 9A:
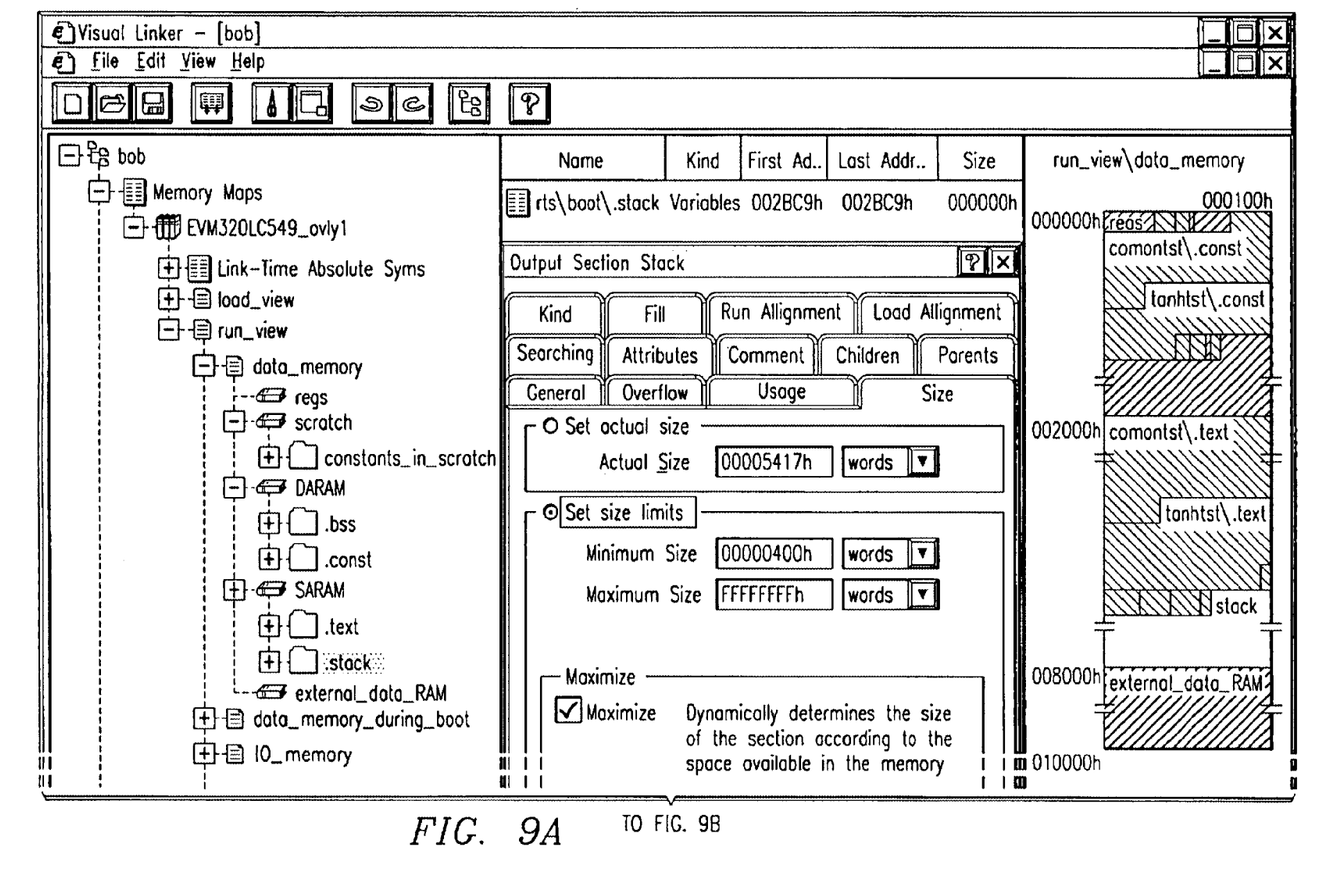
FIG. 9 illustrates a display screen presented by one embodiment of the invention where a user may specify a stack size policy.
Figure 9B:
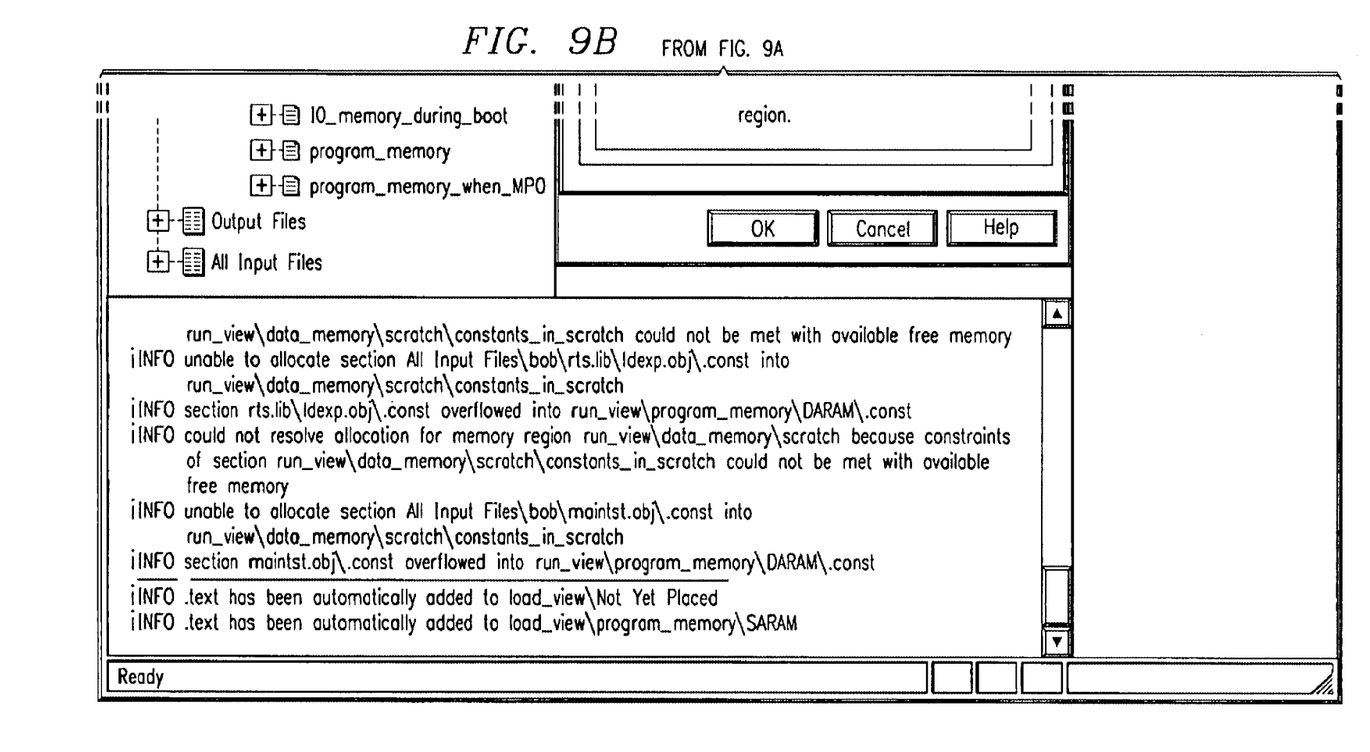

Because the linking strategy is a record of operations requested through API 504, the functionality is not restricted by the syntax of a command language. Operations may be specified to define policy or other concepts difficult to engineer into a traditional linker's command language. For example, a user or client program may specify an overflow policy to be used whenever a portion of memory fills up during allocation. FIG. 8 illustrates the presentation of this operation by the GUI 506 of one embodiment of the present invention. Another operation may allow a user or client program to request an optimized stack or heap size by specifying a minimum and maximum size instead of a particular size and letting the allocator pick the best size within this range. FIG. 9 illustrates the presentation of this operation by the GUI 506 of one embodiment of the present invention. Another operation may allow a user or client program to access across-reference graph in order to perform operations on a list of sections reachable from a particular section. FIG. 10 illustrates the situation where a user interfacing through the GUI 506 of one embodiment of the present invention, may use this feature to view and allocate (using drag-and-drop) all code sections reachable from a square root function called "_sqrt" held in a particular code section.

A complete, linked output file 114 is generated after the sections of ingredients 503 are allocated by visual linker 510. Output file 114 is downloaded into the memories on processor 116. The layout specification, or link strategy, is reflected in linking recipe 512. This specification or strategy may be used again for similar processors 116 and memory descriptions 505, or later modified for different application requirements.

FIG. 5B depicts a flowchart of a method for a visual linker in accordance with an embodiment of the present invention. Step 520 executes by waiting for a command via API 504 or gesture via GUI 506. Step 521 executes by receiving the command or gesture and translating it into a linking instruction to control visual linker 501, and, in particular, link server 508. Step 526 executes by determining the type of instruction received. Step 524 executes if the instruction is a change link instruction that modifies an existing link or incomplete link 510. A change link instruction may control visual linker 501 as described above. After the changes have been made, step 524 executes by updating the allocations made to the target memories define in memory description 505. Step 525 executes by updating symbols.

If the instruction received in step 526 is an information request instruction, then step 530 executes by determining the status of the links, including incomplete link 510, in visual linker 501, and returning that status and other information via API 504 or GUI 506.

If the instruction received in step 526 is a write output instruction, then step 527 executes by determining whether the link defined by the linking operations within visual linker 501 is complete. If no, then step 530 executes by returning the status of the link and other information via API 504 or GUI 506. If yes, then step 528 executes by relocating the symbols defined in ingredients 503 and allocated by link server 508. Step 529 executes by writing output file 114 and map file 208. Step 530 executes by returning the status of the link and other information. Thus, the method is an iterative process that allows visual linker 501 to receive instructions and review the changes within the link of visual linker 501 prior to generating output or map files.

Thus, it is apparent that there has been provided, in accordance with an embodiment of the present invention, a visual linker that satisfies the advantages set forth above. Although the present invention has been described in detail, it should be understood that various changes, substitutions, and alterations may be made herein. Other examples are readily ascertainable by one skilled in the art and may be made without departing from the spirit and scope of the present invention as defined by the following claims.

What is claimed is:

1. A visual linker, comprising:
    an allocation module for allocating sections of code and data into different target memories of a processor;
    an output module for writing a file of said allocated sections of code and data;
    an incomplete link module, wherein said incomplete link comprises allocation information on those sections that are allocated by said allocation module and those that have not yet been allocated without actually completing the link; said allocation information including the allocated position and size of those sections that are allocated to said different target memories;
    a link server that interprets linking instructions, modifies said incomplete link module accordingly and invokes said allocation module accordingly and invokes said output module accordingly;
    an interface for receiving instructions for said link server and for providing feedback as to the state of said incomplete link;
    and a graphical user interface that generates said instructions in response to user gestures and graphically displays the state of said incomplete link.

2. The linker of claim 1 wherein said link server and a link recipe store linking instructions received that describe how the visual linker is to be controlled and can be replayed without interaction to obtain the same effect as the gestures.

3. The linker of claim 2 wherein said stored linking instruction are displayed and altered through said graphical user interface.

4. A method of incrementally and interactively allocating code and data sections, comprising the steps of:
    generate a specific allocation instruction from a client program or program component;
    executing said instruction by making alterations to allocation information associated with one or more code or data sections;
    resolving allocation to the full extent possible given current allocation information associated with all code and data sections involved in a link;
    recording linking instructions received that describe how the visual linker is to be controlled and so that said linking instructions can be replayed without interaction to obtain the same linking effect;
    report to client programs current allocation state inclusive of allocation errors and sections not yet allocated;
    and repeating these steps until all sections of code and data have been allocated.

5. The method of claim 4 including the step of interpreting a user gesture made to a graphical user interface as a specific allocation instruction.

6. The method of claim 5 wherein a gesture is a drag-and-drop operation or a point-and-click operation on a video screen.

7. The method of claim 4 including the step of displaying said current allocation state graphically to the user, inclusive of allocation errors and sections not yet allocated.

8. The method of claim 4 including the step of writing the results to an output file.

9. The method of claim 4 wherein the record of link instructions may be displayed and altered through a graphical user interface.

10. The method of claim 4 wherein the set of code and data sections involved in the link may be determined by a reachability check performed using a cross-reference graph.

11. The method of claim 4 wherein an instruction may specify an overflow policy to be used whenever a portion of memory fills up during allocation.

12. The method of claim 4 wherein an instruction may provide for an allocator-optimized stack or heap size by specifying a minimum and maximum size instead of a particular size.

13. The method of claim 4 wherein one instruction may apply allocation operations to a related group of sections simultaneously.

14. The method of claim 13 wherein the sections may be the set of sections reachable from a specific starting section, as determined by a cross-reference graph.

15. The method of claim 4 including the steps of displaying the record of the link instructions and altering through a graphical user interface.

16. A visual linker, comprising:
    an allocation module for allocating sections of code and data into different target memories of a processor including fast on-chip memory;
    an output module for writing a file of said allocated sections of code and data;
    an incomplete link module, wherein said incomplete link comprises allocation information on those sections that are allocated by said allocation module and those that have not yet been allocated without actually completing the link; said allocation information including the allocated position and size of those sections that are allocated to said different target memories including said fast on-chip memory;
    a link server that interprets linking instructions, modifies said incomplete link module accordingly and invokes said allocation module accordingly and invokes said output module accordingly;
    an interface for receiving instructions for said link server and for providing feedback as to the state of said incomplete link;
    and a graphical user interface that generates said instructions in response to user gestures and graphically displays the state of said incomplete link.

17. The linker of claim 16 wherein said link server and a link recipe store linking instructions received that describe how the visual linker is to be controlled and can be replayed without interaction to obtain the same effect as the gestures.

18. The linker of claim 17 wherein said stored linking instruction are displayed and altered through said graphical user interface.

* * * * *